Figure 7:
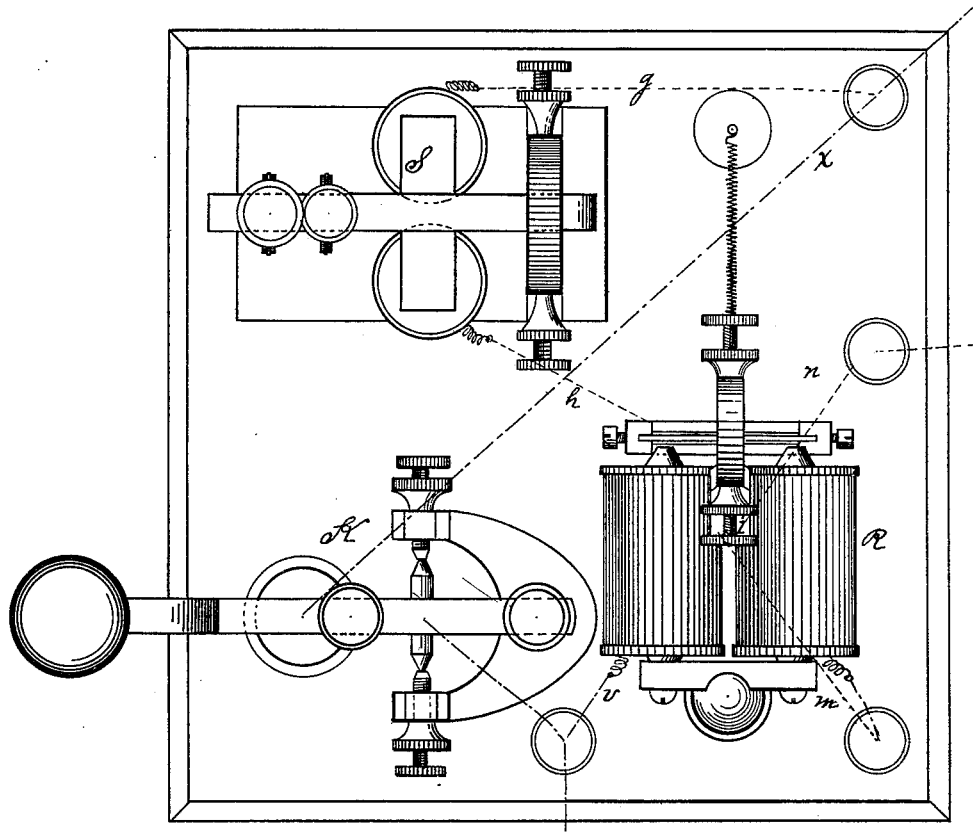

2 Sheets—Sheet 1.
J. R. FINNEY.
Telegraph.
No. 234,260. Patented Nov. 9, 1880.
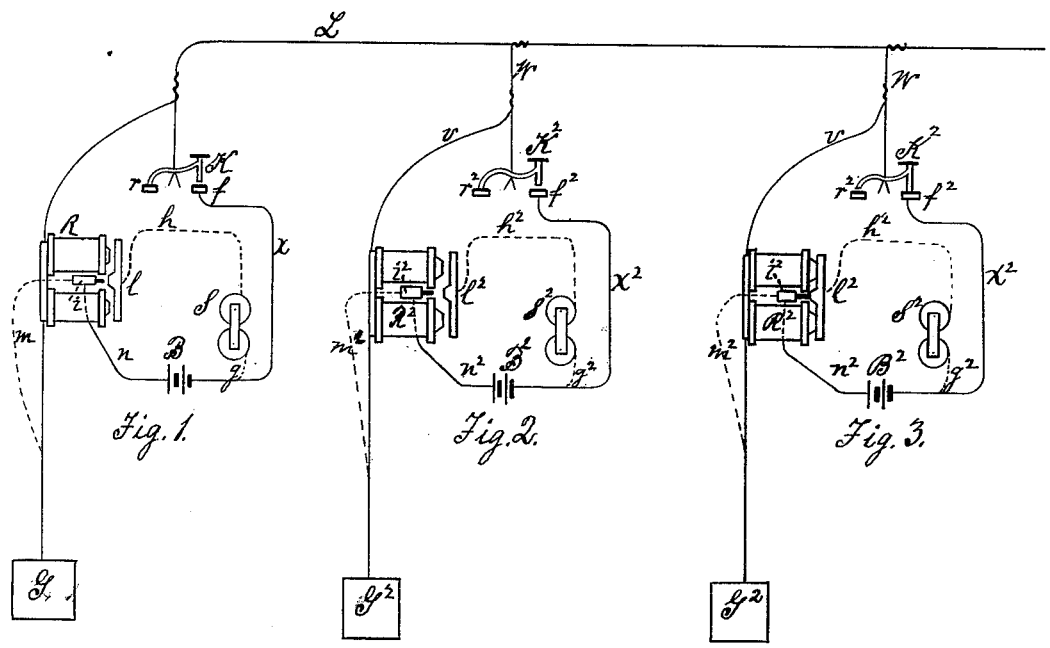
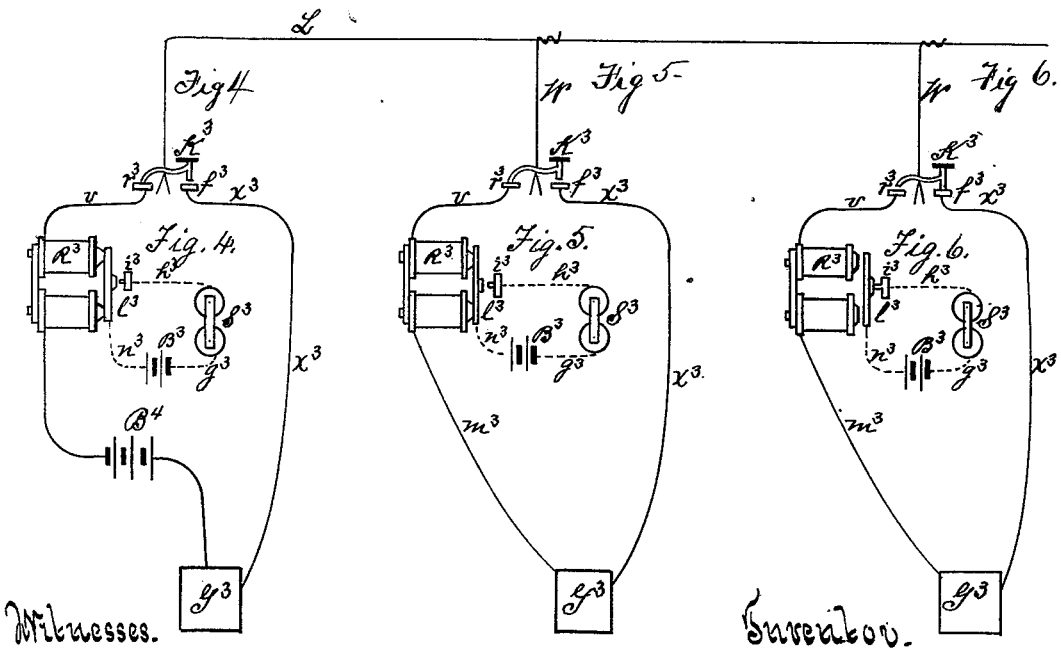
Witnesses.
James K. Bakewell
R. C. Chinshall
Inventor.
Joseph R. Finney 2 Sheets—Sheet 2.

J. R. FINNEY.
Telegraph.

No. 234,260. Patented Nov. 9, 1880.

Witnesses
James K. Bakewell
R. C. Whenshall

Inventor.
Joseph R. Finney

UNITED STATES PATENT OFFICE.

JOSEPH R. FINNEY, OF PITTSBURG, PENNSYLVANIA.

TELEGRAPH.

SPECIFICATION forming part of Letters Patent No. 234,260, dated November 9, 1880.

Application filed October 25, 1879.

*To all whom it may concern:*

Be it known that I, JOSEPH R. FINNEY, of Pittsburg, in the county of Allegheny and State of Pennsylvania, have invented a new and useful Improved Method of Operating Telegraph-Lines; and I do hereby declare the following to be a full, clear, and exact description thereof, reference being had to the accompanying drawings, forming part of this specification, in which—

Figures 1, 2, and 3 represent the arrangement of the wires relatively to the battery and instruments in an open circuit, Fig. 1 being a terminal station and Figs. 2 and 3 intermediate stations. Figs. 4, 5, and 6 represent the arrangement of the wires relatively to the battery and instruments in a closed circuit, Fig. 4 being a terminal station and Figs. 5 and 6 intermediate stations. Fig. 7 is a plan view of the ordinary telegraph apparatus, composing the key, relay, magnet, and sounder, showing the relative connections and the arrangement of wires therewith and with the battery as used by me in an open circuit.

Like letters of reference indicate like parts in each.

In the method of operating a system of telegraph-instruments by a current of dynamic electricity generated by a voltaic battery, and conducted by insulated wires from one terminal station to the other, as ordinarily practiced, the main batteries are located at each terminus of the telegraph-line. At one terminus the negative pole of the battery is connected by a wire with the ground, while from the positive pole of the battery the wire passes to the key of the telegraph-instrument, and thence is connected with the helices of the relay-instrument, and thence is conducted to the other terminal station, where, passing through the helices of the relay, it connects with the key, and thence with the negative pole of the other main battery, from the positive pole of which the wire is connected with the ground. Unless, however, the distance between the termini is very short, there are numerous way-stations connected with the main line, each of which is furnished with a relay-instrument operated by the current passing through the main wire from the terminal stations.

The resistance presented by the coils of wire which surround the soft-iron bars in the relay-instruments is a serious obstacle to the passage of the electric current, and the dissipation of the current resulting partly therefrom and partly from the resistance of the conducting-wires is such that it is necessary in a long line to have a very large battery force at each terminus, in order to supply the main current, besides which a local battery is placed at each intermediate station to operate the sounder or registering-instrument, whichever may be used.

There is also a considerable loss of force by leakage arising from imperfect insulation, which is further increased by the fact that at each intermediate station between the main termini the main line of wire is intercepted and the current switched off so as to pass through the way-station and the relay instrument or instruments there located. This is especially the case on all lines operated with a closed circuit, as is almost universally the practice in the United States.

The necessity for intercepting the main line and the carrying of the entire current of the main line through the instruments at each way-station is also liable to other incidental objections of considerable importance, among which may be named the liability to interruption arising from accidents to the apparatus at the way-stations, whereby the current is cut off from the termini, or the negligent failure of the operator to close his circuit-closer or switch when leaving his office, which stops all communication between the termini.

In the use of my improvement side currents of electricity or leaks are drawn off from the main-line wire for the operation of instruments at stations intermediate to the main termini without interrupting the flow of the main current through the line-wire and without intercepting the main current by insulation of the conductor on either side of the intermediate station, and when an open circuit is used the electric current is transmitted along the main line from any station, either terminal or way, by means of the local batteries at such station alone, thereby dispensing with a large proportion of the battery-power found necessary in the ordinary method of operation.

In the practical operation of my improvement either a closed or an open circuit may be used, and as I consider the open circuit preferable I shall first describe my improvement as applied to such circuit, and then explain the slight changes necessary to adapt it to use on the closed circuit.

In the accompanying drawings, Figs. 1, 2, and 3 represent the arrangement of the wires and apparatus used by my method of operation, with an open circuit, Fig. 1 representing the arrangement at one of the termini of the telegraph-line and Figs. 2 and 3 the arrangement at intermediate stations.

I may premise that the apparatus is represented in the figures by the conventional signs universally adopted and well understood by scientific men and those skilled in the art of telegraphy, and that unless otherwise specially stated the apparatus used may be that ordinarily employed in telegraphing or any other suitable apparatus for the same purposes.

The main wire extending between the telegraphic termini should be continuous, the pieces of which it is composed being electrically connected throughout its entire length, instead of being, as is usual, deflected into the way-stations along the line and there connected with the instruments. The electrical connection between the continuous main wire and each of the several intermediate stations along its route is effected by a branch wire, looped, twisted, or otherwise electrically connected with the main wire, and thence extending to the instruments to be operated thereby. No return wire is needed.

The apparatus used at each of the termini may be alike, and may also be the same as that used at the several way-stations with the addition at the termini of such switches and other devices as are necessary at telegraph centers, and are not so much needed at intermediate points.

At the terminal station (represented by Fig. 1) is placed a battery, B, of any desired construction, from one pole of which a wire is grounded at G, as hereinafter described, while from the other pole a wire connects with the base-plate of the key having electrical connection with its front contact, and the key is electrically connected with the wire of the main line, which thence extends continuously and uninterruptedly to the terminus at the other end of the line.

A relay instrument and sounder or registering-instrument are connected with this battery, in the same manner as is hereinafter described, in relation to the intermediate stations, or, if preferred, in the manner ordinarily practiced.

On reaching the terminus at the other end of the line the wire enters the office and is connected with the instruments there in the same way as at the first terminal station, the wire being grounded in the usual manner.

Such being the arrangement of the wire and instruments at the termini, I will proceed to describe the connection of the wire with the instruments at the intermediate stations. This is shown in Figs. 2 and 3, and is the same at all the way-stations, and may also be the same at the termini.

The branch wire W, electrically connected, as described, with the main line of wire L opposite the way-station, is carried to and electrically connected with the key $K^2$, and a side wire, $r$, from the branch W connects with one of the helices or wires of the relay-instrument $R^2$, the other end of the helical wire being grounded at $G^2$. A local battery, $B^2$, is connected with the relay-instrument $R^2$ and with the sounder $S^2$, or registering-instrument, as the case may be, as shown in Fig. 2—that is to say, a short wire, $q^2$, connects one pole of the local battery $B^2$ with one of the helices of the sounder $S^2$, and another wire, $h^2$, connects the other helix of the sounder with the vibrating armature $l^2$ of the relay $R^2$, which, when the current passes through the relay, presses against the contact-point of the standard $i^2$, to form electrical connection when the relay is closed. From this standard $i^2$ a wire, $m^2$, is connected with the ground at $G^2$. The other pole of the local battery $B^2$ is connected with the standard $i^2$ of the relay by a short wire, $n^2$. Thus the relay-instrument and sounder are both placed in the circuit of the local battery $B^2$, and the sounder is operated simultaneously with the relay. The effect of this arrangement and connection is, that when a message is sent or any signal communicated from either of the termini, or from any other intermediate station, a portion of the electric current from the main wire L passes along the branch wire W and side wire $r$ through the relay-instrument $R^2$, and thence to the ground at $G^2$, the result being that the relay is operated to deliver the message, which is simultaneously repeated by the sounder. The main current continues along the main-line wire L to the next station, Fig. 3, and operates the instruments there in like manner, and so on at each station to the end of the line.

A wire, $x^2$, connects the base-plate of the key at its front contact with one of the poles of the local battery $B^2$, while the other pole of the battery, as before described, is connected by the wire $n^2$ with the standard $i^2$ of the relay-instrument $R^2$, and thence through the wire $m^2$ connects with the ground at $G^2$. By this arrangement when the key is not depressed, as in Fig. 2, the circuit is open, and no current passes from the local battery $B^2$ to the main wire, nor does any current pass in from the main wire L to the local instrument until and unless some other battery on the line is put in connection with the main wire L, and then only passes over the wire $v$ and through the relay to the ground.

By opening and closing the circuit by the key $K^2$ the usual telegraphic signals are sent along the main line of wire in both directions from the local office.

It will be seen that by reason of the local battery $B^2$ being connected at one pole with the main wire, where the key $K^2$ is depressed, as in Fig. 3, and at the other pole with the earth the current from the battery is carried onto the main-line wire in the same way as the current from the battery at either terminus, and so with each local battery at every way-station. Hence, with an open circuit it is not necessary to have more battery power at the termini of the line than at the way-stations, and thus a great saving of battery power is effected.

Another advantage of this arrangement is that no break in the main line affects in any way any of the intermediate stations between the break and the terminus, the last way-station between the office from which a message is being sent and the break becoming in effect a terminus of the line. So, also, in case of there being more breaks than one on the main line, any two or more stations between the breaks will continue in electrical connection with each other, even though neither has any connection with either of the termini of the line, the telegraph-office nearest to the break becoming for the time a terminus. It will also be observed that when an open circuit is used, as shown in Figs. 1 to 3, no current is passing along the main line, unless and until one of the instruments in connection therewith is put into operation.

It might be supposed that the connection of the main-line wire with the instrument at each intermediate station, and through them to the ground being so often repeated, would result in such a waste of the electric current as soon to render it too weak on the main line to operate the instruments at stations removed some distance from the battery transmitting its current to the line. Such, however, will not be found to be the case in practice, and hence arises one of the chief advantages of my improvement.

The interposition of the relay-instrument between the main wire L and the ground at the stations receiving the message will ordinarily afford such resistance that no more current will pass off from the main wire L at each intermediate station than is sufficient to operate the armature of the relay, the local battery at each receiving-point furnishing the power to operate the sounder. The resistance presented by the relay-instrument thus prevents the diversion of too much of the current from the main line.

If it should be found at any station that an unnecessary amount of current is passing off by the branch wire W through the local instruments to the ground a resistance-coil of fine covered wire, of any desired length, or other resistance device, may be interposed between the main line and the relay to check the waste.

In sending a message from any station the direct current from the local battery passes through the key $K^2$, (see Fig. 3,) to the main-line wire without passing through the helices of the relay-magnet, and, therefore, meets with little or no resistance. The relay being operated by a leak effected through the short side wire, $v$, the amount of which leak will be regulated and restrained by the resistance of the helices of the relay, and also, if necessary, by the interposition of a resistance device, as before stated, which should be placed in the side wire, $v$, and not in the branch wire W, so as not to interfere with the outflow of the current to the main line L from the local battery $B^2$.

Thus far I have confined my description to the application of my improvement to a line using an open circuit. I will now proceed to explain the modifications required for its application to a line having a closed circuit.

In an open circuit, as used with my improvement, as before stated, no current passes through the main line excepting when one of the instruments connected therewith is set in operation, and in that case the electric current passing over the main line starts from the local battery where the instrument is being used, which thus becomes practically the electric terminus, for the time being. But in the closed-circuit system, as ordinarily used, the current from the battery at the terminus is constantly passing over the wires to the other terminus, so that at all the stations it is necessary to keep the circuit closed, for if this is not done the electric connection between the termini is broken, and so continues until the circuit is closed. In the closed circuit, as ordinarily used, the normal condition is for the current to be passing over the main wire to the next station and through the instruments placed there, and thence back to the main wire, and so on from station to station; and the operation of the instrument in sending a message is commenced by breaking the contact at the key or opening the circuit. In the open circuit, on the other hand, the normal condition is to have no current passing over the wires or through the instruments, and the operation of working the instruments is commenced by the depression of the key and thus closing the circuit, thereby connecting the main line with the local battery.

In the open-circuit system as used by me the operation is effected by the outflow of the electric current from the local battery of the station from which the message is sent to the main line; but in the use of the closed circuit, as used by me, the operation is effected by the inflow of the current from the main line of wire to the instruments, and thence to the ground. Hence it becomes necessary, where a closed circuit is used, to work all the instruments at the intermediate as well as at the terminal stations from the battery $B^4$ at the terminal station, instead of by the local battery only.

From this statement it will be seen that the changes involved in the adaptation of my system to the use of the closed circuit are very simple, requiring an alteration of arrangement without any change of construction. The same single branch wire W is used to connect the apparatus in the intermediate station with the main line of wire L without any return-wire. This branch wire is connected with the key K³, as in the open circuit, (Figs. 2 and 3,) so that the current may pass either through the side wire, r, or through the other side wire, x³, on either side of the key, according as either the front or rear contacts of the key is closed and the other open.

The wire x³, instead of connecting with the local battery, is run directly to the ground at G³, and the connection of the local battery-wires n³ and h³ is reversed from that previously described, and shown in Figs. 2 and 3, the wire n³, from one pole of the battery, being connected with the armature l³ of the relay, and the wire h³, from the other pole of the battery, being connected with the standard i³ also.

The standard i³, which forms contact with the armature l³ of the relay-instrument, is placed on the other side of the armature, so that instead of forming contact with the armature when the relay is closed it forms contact when the relay-magnet is open. This is rendered necessary by the operation of the apparatus, as the front contact of the key K³ is closed when the armature of the magnet is released.

The only other changes necessary are to connect the side wire, r, with the rear contact-point, r³, of the base of the key, instead of directly with the branch wire W, between the key and the main wire L, and that the local battery is not grounded.

The difference in arrangement between the open and closed circuit systems will be seen by comparing Figs. 2 and 3 with Figs. 4 and 5.

The operation is as follows: When the instrument is not being used for sending, as in Fig. 5, the front contact, f³, of the key with the wire x³ is broken, while the rear contact of the key with the wire r is closed. Hence, whatever current enters through the branch wire W flows through the relay-instrument to the ground by the wire m³. When, however, the current is intermitted on the main line the armature opens, which closes the circuit of the local battery B³, and thus the armature and sounder are operated.

In sending a message, as in Fig. 6, when the key K³ is depressed the current flows through the key at its front contact, f³, and wire x³ directly to the ground at G³, and at the same time the flow of the main current through the relay-instrument is stopped and the armature of the relay, which before was closed, is opened by its spring, the sounder being similarly operated by the local battery B³, set in operation by contact of the armature l³ and standard i³.

It will be observed that in the use of the closed circuit with a single inleading wire, W, by my system, in the operation of sending a message, the closing of the front contact of the key permits the entire current to flow to the ground at G³, thus depriving all the instruments on the line of any operative current, while the breaking of the contact at the key permits the current to flow on the main wire without interruption, and thus the telegraphic signals are produced.

The method which I have described of dividing the electric current so as to use a portion only of it at each instrument without breaking the continuity of the main portion of the current, which I effect by grounding so much of the current as is diverted from the main line at each station while preventing the grounding of the entire current by means of interposed resistance, as hereinbefore described, is not only useful in its application to the operation of lines of telegraph, but is also applicable with great advantage and important results to other applications of the electric current, such as electric lights, electro-motors, &c.

Having described my improvement as applied to the operation of telegraph-lines by dynamic electricity, what I claim as my invention, and desire to secure by Letters Patent, is—

1. The combination, in open or closed circuit, of a single branch wire, at the intermediate station or stations, from an electrically unbroken main-line wire, a resistance interposed between the main wire and the ground, a key, and a battery and sounder, for the sending and receiving of telegraphic signals, substantially as described.

2. In a closed circuit, the combination of an electrically-continuous main-line wire, a single branch wire therefrom to each intermediate station and connecting with a key having front and rear connections with the ground, and a relay interposed on one of those connections between the key and the ground, substantially as described.

3. The combination of an electrically-continuous main-line wire, a single branch wire to each intermediate station, a key having front and rear contacts, with ground-connection to each, one of which connections has an interposed resistance, a local battery, and a sounder or registering-instrument for sending and receiving telegraphic signals with a closed circuit, substantially as described.

In testimony whereof I, the said JOSEPH R. FINNEY, have hereunto set my hand.

JOSEPH R. FINNEY.

Witnesses:
JAMES H. PORTE,
T. B. KERR.